US009784858B2

United States Patent
Fukuda et al.

(10) Patent No.: US 9,784,858 B2
(45) Date of Patent: Oct. 10, 2017

(54) NEUTRON SCINTILLATOR, NEUTRON DETECTOR AND METHOD FOR MANUFACTURING NEUTRON SCINTILLATOR

(71) Applicant: Tokuyama Corporation, Yamaguchi (JP)

(72) Inventors: Kentaro Fukuda, Yamaguchi (JP); Hiroaki Saito, Yamaguchi (JP)

(73) Assignee: Tokuyama Corporation, Yamaguchi (JP)

( * ) Notice: Subject to any disclaimer, the term of this patent is extended or adjusted under 35 U.S.C. 154(b) by 0 days.

(21) Appl. No.: 15/032,323

(22) PCT Filed: Oct. 28, 2014

(86) PCT No.: PCT/JP2014/078660
§ 371 (c)(1),
(2) Date: Apr. 27, 2016

(87) PCT Pub. No.: WO2015/064588
PCT Pub. Date: May 7, 2015

(65) Prior Publication Data
US 2016/0259070 A1    Sep. 8, 2016

(30) Foreign Application Priority Data
Oct. 28, 2013 (JP) ................... 2013-223064

(51) Int. Cl.
*G01T 3/00* (2006.01)
*G01T 3/06* (2006.01)
(Continued)

(52) U.S. Cl.
CPC ............ *G01T 3/06* (2013.01); *C09K 11/02* (2013.01); *C09K 11/7734* (2013.01); *G21K 4/00* (2013.01);
(Continued)

(58) Field of Classification Search
CPC ........ G01T 3/06; C09K 11/02; C09K 11/7734
(Continued)

(56) References Cited

U.S. PATENT DOCUMENTS 8,044,367 B2     10/2011  Yoshikawa et al.
2003/0164453 A1*  9/2003  Nakata .................. C03B 37/028
                                                                                          250/370.09
(Continued)

FOREIGN PATENT DOCUMENTS

EP      3153562 A1    4/2017
GB      2482024 A    12/2012
(Continued)

OTHER PUBLICATIONS

Extended European Search Report, dated May 3, 2017.
(Continued)

*Primary Examiner* — David Porta
*Assistant Examiner* — Meenakshi Sahu
(74) *Attorney, Agent, or Firm* — Cahn & Samuels, LLP

(57) ABSTRACT

A neutron scintillator is formed of a resin-based composite. The resin-based composite includes a phosphor part (A) formed of a resin composition including inorganic phosphor particles containing at least one kind of neutron-capturing isotope that is selected from lithium 6 and boron 10 such as Eu:LiCaAlF$_6$ and a resin, and at least one wavelength converting part (B) comprising a wavelength converting fiber or a wavelength converting sheet. In the neutron scintillator, it is preferred that the wavelength converting part (B) is enclosed in the phosphor part (A).

15 Claims, 9 Drawing Sheets

(51) Int. Cl.
*C09K 11/02* (2006.01)
*C09K 11/77* (2006.01)
*G21K 4/00* (2006.01)

(52) U.S. Cl.
CPC ..... *G21K 2004/06* (2013.01); *G21K 2004/08* (2013.01)

(58) Field of Classification Search
USPC .................................................... 250/390.11
See application file for complete search history.

(56) References Cited

U.S. PATENT DOCUMENTS

| | | | |
|---|---|---|---|
| 2005/0135535 A1 | 6/2005 | Wallace | |
| 2007/0295915 A1 | 12/2007 | Kraemer et al. | |
| 2008/0311380 A1* | 12/2008 | Agrawal | B82Y 30/00 428/323 |
| 2009/0242784 A1 | 10/2009 | Kraemer et al. | |
| 2010/0294415 A1 | 11/2010 | Frank | |
| 2013/0049575 A1* | 2/2013 | Fujita | C03C 8/08 313/503 |
| 2013/0146775 A1 | 6/2013 | Ramsden et al. | |
| 2017/0052265 A1 | 2/2017 | Fukuda et al. | |

FOREIGN PATENT DOCUMENTS

| | | |
|---|---|---|
| JP | H06258446 A | 8/1994 |
| JP | 2002071816 A | 3/2002 |
| JP | 2002341041 A | 11/2002 |
| JP | 2007517949 A | 7/2007 |
| JP | 2011141239 A | 7/2011 |
| JP | 2013160625 A | 8/2013 |
| WO | 2009119378 A1 | 10/2009 |
| WO | 2011159911 A2 | 12/2011 |
| WO | 2013027069 A2 | 2/2013 |

OTHER PUBLICATIONS

International Preliminary Report on Patentability, dated May 12, 2016.
English Abstract of JPH06258446 A, dated Sep. 16, 1994.
English Abstract of JP2002341041 A, dated Nov. 27, 2002.
Sugimoto, D. et al.: "Study on neutron detector using a rubber dispersing small pieces of LiCaAlF6 scintillator", Dai 74 Kai The Japan Society of Applied Physics, p. 02-044, Sep. 16, 2013.
English Abstract of JP2013160625, dated Aug. 19, 2013.
English Abstract of WO2009119378 A1, dated Sep. 1, 2009.
English Abstract of JP2002071816 A, dated Mar. 12, 2002.
English Abstract of JP2011141239 A1, dated Jul. 21, 2011.

* cited by examiner

Fig.1
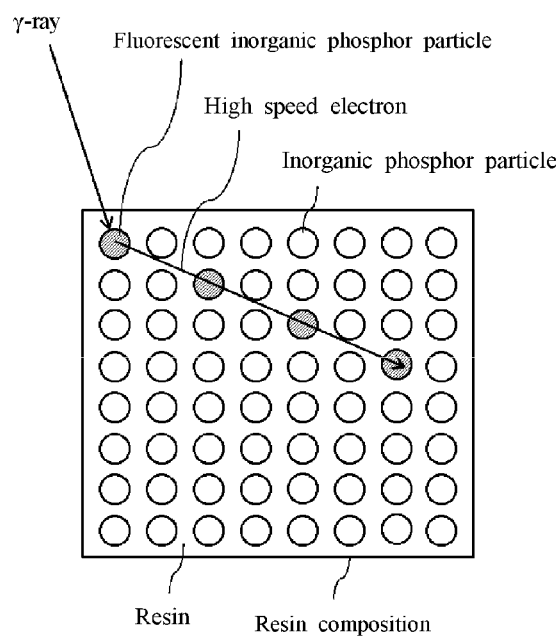
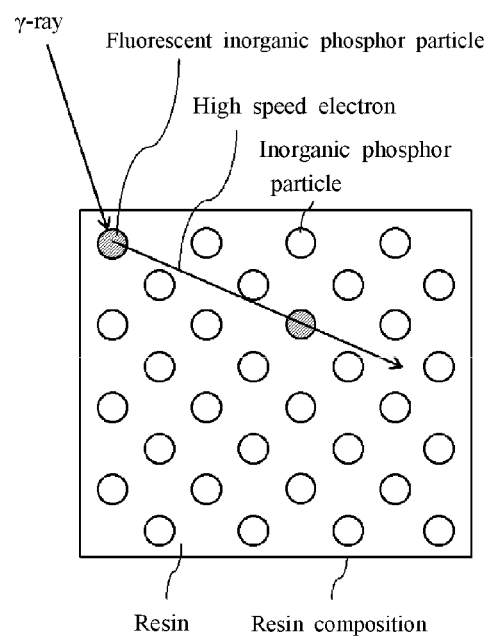
When the space between the particles is small
When the space between the particles is large

NEUTRON SCINTILLATOR, NEUTRON DETECTOR AND METHOD FOR MANUFACTURING NEUTRON SCINTILLATOR

This application is a U.S. national stage application of PCT/JP2014/078660 filed on 28 Oct. 2014 and claims priority to Japanese patent document 2013-223064 filed on 28 Oct. 2013, the entireties of which are incorporated herein by reference.

TECHNICAL FIELD

The present invention relates to a neutron scintillator and a neutron detector using said neutron scintillator. Specifically, the present invention relates to the neutron scintillator comprising the wavelength converting fiber or the wavelength converting sheet for collecting the light, and the present invention relates to a novel neutron scintillator and neutron detector having high neutron detection efficiency, and capable of accurately counting the neutron in a field with high dose of γ ray as the background noise.

BACKGROUND OF THE INVENTION

The neutron detector is an elemental technology which supports the technology using neutrons, and along with the development of the technology using neutrons in the security field such as cargo inspection or so, the academic research field such as the structural analysis by a neutron diffraction or so, a nondestructive inspection, or the medical field such as boron neutron capture therapy or so, the neutron detector having higher performance is in demand.

As the important characteristic which is required for the neutron detector, the neutron detection efficiency and the discrimination ability between neutrons and γ ray (hereinafter, it may be referred as n/γ discrimination ability) are mentioned. The neutron detection ability refers to the ratio of the numbers of neutrons counted by the detector with respect to the number of neutron entered in the detector; and if the neutron detection efficiency is low, the absolute numbers of neutrons being counted will decline, hence the counting accuracy will decline. Also, γ ray exist as a natural radiation, and further it is generated when neutrons contact with the constituting member of the detector system for detecting neutrons or when neutrons contact the inspection objects; thus if the n/γ discrimination ability is low and γ ray is counted as neutrons, then the neutron counting accuracy will decline.

In case of detecting neutrons, since neutron has strong force to transmit through the material without causing any mutual interaction in the substance, it is generally detected using the neutron capture reaction. For example, helium 3 detector is known conventionally which detects using proton and tritium generated by a neutron capture reaction between helium 3 and neutrons. This neutron detector is a proportional counter tube filled with helium 3 gas which has high detection efficiency and excellent n/γ discrimination ability; however helium 3 is expensive substance and furthermore the resources are limited.

Recently, instead of the above mentioned helium 3 detector, the neutron detector using the neutron scintillator has been developed. The neutron scintillator refers to the substance which emits fluorescent light when neutrons enter due to the effect of said neutrons, and by combining the photo-detector such as a photomultiplier tube or so with the neutron scintillator, the neutron detector can be made. Note that, the aforementioned various performances of the neutron detector using said neutron scintillator depends on the substance constituting the neutron scintillator. For example, if large amount of the isotope having high neutron capture reaction efficiency is comprised, then the detection efficiency against neutrons will be enhanced. As such isotope, lithium 6 or boron 10 or so may be mentioned (for example, the patent document 1).

In said neutron detector, the photodetector will detect the light emitted from the neutron scintillator, and the pulse form signal will be output from the photodetector. In general, the numbers of neutrons are measured by the intensity of the pulse form signal so called a pulse-height. That is, for said pulse-height, a predetermined threshold is set, and the event showing the pulse-height higher than said threshold is counted as the neutron incident event; on the other hand the event showing the pulse-height lower than the threshold is considered as a noise. Therefore, in order to enhance n/γ discrimination ability, it is important to reduce the pulse-height generated by γ ray incident.

Also, in said neutron detector, in order to collect the light from the phosphor having large sensitive area, or to provide the position resolution to the neutron detector, the wavelength converting fiber is used (see the patent documents 2 to 5).

PRIOR ART

[Patent Article 1] WO 2009/119378
[Patent Article 2] JP Patent Application Laid Open No.2011-141239
[Patent Article 3] JP Patent Application Laid Open No.2002-71816
[Patent Article 4] WO 2011/159911
[Patent Article 5] WO 2013/027069

The neutron detector using said neutron scintillator has the advantage of having high detection efficiency against neutrons, however it is also sensitive to γ ray, thus the n/γ discrimination ability was poor.

Particularly, in case of collecting the light using said wavelength converting fiber or wavelength converting sheet, the loss of light during the light collection is large and furthermore the n/γ discrimination ability deteriorates.

The present invention is attained to solve such problems, and the object of the present invention is to provide the neutron scintillator comprising the wavelength converting part comprising the wavelength converting fiber or the wavelength converting sheet for collecting the light, and to provide a novel neutron scintillator and neutron detector having high neutron detection efficiency, and capable of accurately counting the neutron in a field with high dose of γ ray as the background noise.

SUMMARY OF THE INVENTION

The present inventors has carried out keen examination to obtain the neutron scintillator having excellent neutron detection efficiency and n/γ discrimination ability by using inorganic phosphor particles comprising at least one neutron-capturing-isotope selected from lithium 6 and boron 10. As a result, the present inventors have come up with an idea to form the shape of said inorganic phosphor to particle form, and by using the resin composition wherein the inorganic phosphor particles and the resin are mixed as the neutron scintillator, a good n/γ discrimination ability can be obtained. Further, the present inventors have found that even in case of the resin based complex wherein the wavelength converting part for collecting the light and said resin composition are combined, it is found that excellent n/γ discrimination ability can be obtained compared to the conventional technology; thereby the present invention was attained.

That is, according to the present invention, a neutron scintillator comprising a resin based complex comprising;

a phosphor part (A) comprising a resin composition including a resin, and inorganic phosphor particles comprising at least one neutron-capturing isotope selected from lithium 6 and boron 10; and at least one wavelength converting part (B) comprising a wavelength converting fiber or a wavelength converting sheet is provided.

For the neutron scintillator, preferably the wavelength converting part (B) is contained in the phosphor part (A). Also, in the emission wavelength of the inorganic phosphor particle, the ratio of the refractive index of the inorganic phosphor against the refractive index of the resin is preferably within the range of 0.95 to 1.05. Further, the ratio of the refractive index of the wavelength converting part (B) against the refractive index of the resin is preferably 0.95 or more, and particularly preferably 1 or more.

Also, according to the present invention, the neutron detector comprising said neutron scintillator and a photodetector is provided.

Also, the neutron scintillator according to the present invention may be produced by any method, however for example producing the mixture made by mixing the inorganic phosphor particles and the liquid or viscus resin, or a resin precursor, and then placing a part of at least one wavelength converting part (B) comprising the wavelength converting fiber or wavelength converting sheet in said mixture, thereby the neutron scintillator wherein a part of the wavelength part (B) contained in the phosphor part (A) which is made by placing said mixture in the container or by curing said mixture can be produced.

According to the present invention, the neutron scintillator comprising the wavelength converting part comprising the wavelength converting fiber or the wavelength converting sheet to collect the light, having excellent neutron detection efficiency and n/γ discrimination ability can be provided; and the neutron detector using said neutron scintillator can be provided. Said neutron detector can accurately count neutrons even in a field with high dose of γ ray as the background noise, and also the neutron detector having large sensitive area or the positon resolution can be made easily, thus it can be suitably used in the security field such as cargo inspection or so, the academic research field such as the structural analysis by a neutron diffraction or so, a nondestructive inspection, or the medical field such as boron neutron capture therapy or so.

BRIEF DESCRIPTION OF THE DRAWINGS

FIG. 1 is a schematic diagram of the resin composition comprising the inorganic phosphor particles and the resin.

DETAILED DESCRIPTION OF THE INVENTION

Figure 2:
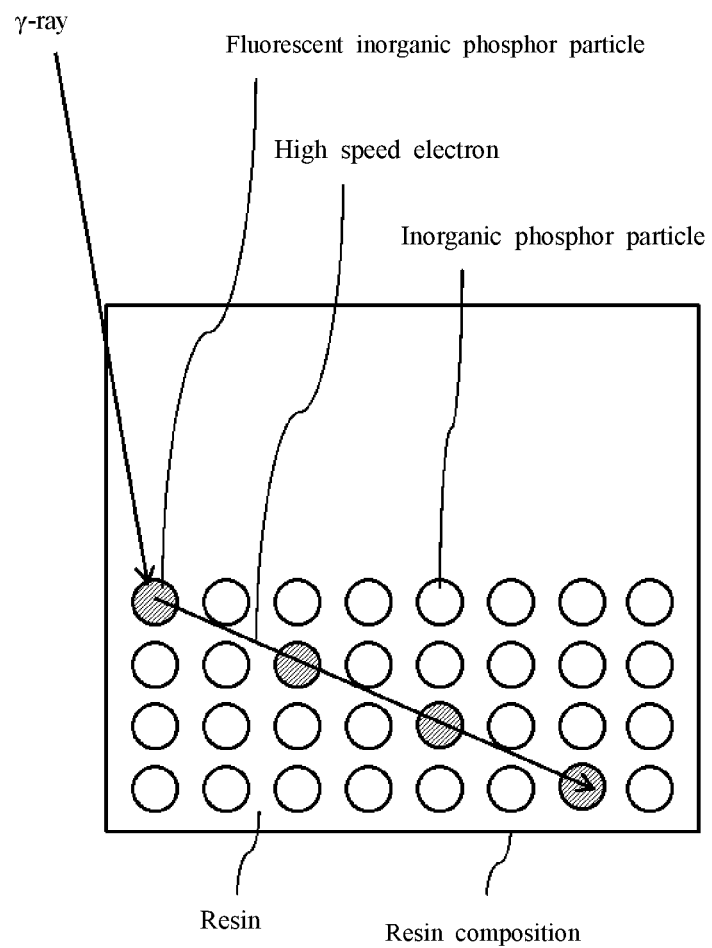
FIG. 2 is the schematic diagram of the resin composition comprising the inorganic phosphor particles and the resin.

The scintillator of the present invention comprises the inorganic phosphor particles comprising at least one neutron-capturing-isotope selected from the group consisting of lithium 6 and boron 10 (hereinafter, it may be simply referred as "inorganic phosphor particles") as the first constituting element.

In the inorganic phosphor particles, due to the neutron capture reaction between lithium 6 or boron 10 with neutrons, α ray and tritium or α ray and lithium 7 (hereinafter, it may be referred as secondary particles) are respectively generated; and the energy of 4.8 MeV or 2.3 MeV is provided to the inorganic phosphor particles by said secondary particles. As such energy is provided, the inorganic phosphor particles are excited, and emit the fluorescent light.

The neutron scintillator using said inorganic phosphor particles has high efficiency of neutron capture reaction by lithium 6 and boron 10, hence has excellent neutron detection efficiency; and also since the energy supplied to the inorganic phosphor particles after the neutron capture reaction is high, also has excellent intensity of the fluorescence which is emitted when detecting neutrons.

Note that, in the present invention, the inorganic phosphor particle is the particle comprising the inorganic material which comprises the neutron-capturing-isotope and emits the fluorescence; but it does not include the mixture particle of which the non-phosphor particles comprising the neutron-capturing-isotope and the phosphor particle which does not comprise the neutron-capturing-isotope are mixed. Further specifically, for example, the mixture particle mixing non-fluorescent LiF comprising the neutron-capturing-isotope and the fluorescent ZnS:Ag which does not comprise the neutron-capturing-isotope is not included (refer to the example 2 of the patent document 2). In such mixture particle, the energy of the secondary particles generated by the particle comprising the neutron-capturing-isotope will be partially lost before it reaches to the particle emitting the fluorescent light. Here, the energy being lost varies depending on the range from the originating point of the secondary particle to the particle emitting the fluorescent light; hence as a result, the fluorescence intensity of the particle emitting the fluorescent light varies largely. Therefore, desired n/γ discrimination ability cannot be obtained, thus said mixture particle is not used in the present invention.

In the present invention, the content of lithium 6 and boron 10 (hereinafter, it may be referred as a neutron-capturing-isotope content) in the inorganic phosphor particles are preferably $1 \times 10^{18}$ atom/mm$^3$ or more and $0.3 \times 10^{18}$ atom/mm$^3$ or more respectively; and more preferably $6 \times 10^{18}$ atom/mm$^3$ or more and $2 \times 10^{18}$ atom/mm$^3$ or more respectively. Note that, the above mentioned neutron-capturing-isotope content refers to the number of the neutroncapturing-isotope included per 1 mm³ of inorganic phosphor particles. By setting the neutron-capturing-isotope content within above mentioned range, the chances of the incident neutron causing the neutron capture reaction increases; hence the neutron detection efficiency improves.

Said neutron-capturing-isotope content can be regulated appropriately by selecting the chemical composition of the inorganic phosphor particles and by regulating the isotope ratio of lithium 6 and boron 10 in lithium fluoride (LiF) or boron oxide ($B_2O_3$) or so which is used as the source material of the inorganic phosphor particles. Here, the isotope ratio is the element ratio of lithium 6 isotope against the entire lithium element, and the element ratio of boron 10 isotope against entire boron element; and in case of natural lithium and boron, it is about 7.6% and 19.9% respectively. As for the method for regulating the neutron-capturing-isotope content, the method of using the general purpose material having the natural isotope ratio as the starting source material, then condensing to the predetermined isotope ratio of lithium 6 and boron 10; or the method of using the condensed source material having the higher isotope ratio of lithium 6 and boron 10 than the predetermined isotope ratio, then mixing said condensed source material and said general-purpose source material or so may be mentioned.

On the other hand, although the upper limit of the neutron-capturing-isotope content is not particularly limited, it is preferably $60 \times 10^{18}$ atom/mm³ or less. In order to attain the neutron-capturing-isotope content exceeding $60 \times 10^{18}$ atom/mm³, it would be necessary to use a large amount of special source material wherein the neutron-capturing-isotope content is condensed to high concentration; thus the production cost becomes extremely high, and also the choice of the type of the inorganic phosphor particles will be very limited.

Note that, the content of lithium 6 ($C_{Li, P}$) and boron 10 ($C_{B, P}$) in the above mentioned inorganic phosphor particles can be determined by obtaining the density of the inorganic phosphor particles, the weight fraction of lithium and boron in the inorganic phosphor particles, and the isotope ratio of lithium 6 and boron 10 in the source material in advance, and then placing these into the equation (1) and the equation (2) as shown in below. Note that, the calculations according to the following equations (1) and (2) are based on the case wherein the units for the content of lithium 6 ($C_{Li, P}$) and the content of boron 10 ($C_{B, P}$) are "atom/nm³"; however these may be converted to other units depending on the needs.

$$C_{Li, P} = \rho \times W_{Li} \times R_{Li}/(700-R_{Li}) \times A \times 10^{-23} \quad (1)$$

$$C_{B, P} = \rho \times W_B \times R_B/(1100-R_B) \times A \times 10^{-23} \quad (2)$$

(In the above formula, $C_{Li, P}$ and $C_{B, P}$ are respectively the content of lithium 6 and the content of boron 10 in the inorganic phosphor particles, $\rho$ is the density [g/cm³] of the inorganic phosphor particles, $W_{Li}$ and $W_B$ are respectively the weight fraction [wt %] of lithium and boron in the inorganic phosphor particles, $R_{Li}$ and $R_B$ are respectively the isotope ratio [%] of lithium 6 and boron 10 in the source material, and A is Avogadro's constant [$6.02 \times 10^{23}$].

Said inorganic phosphor particles are not particularly limited, and the particle form of the conventionally known inorganic phosphors can be used; however for example the inorganic phosphor particles comprising the crystal of Eu:LiCaAlF$_6$, Eu, Na:LiCaAlF$_6$, Eu:LiSrAlF$_6$, Ce:LiCaAlF$_6$, Ce, Na:LiCaAlF$_6$, Ce:LiSrAlF$_6$, Ce:LiYF$_4$, Tb:LiYF$_4$, Eu:LiI, Ce: Li$_6$Gd(BO$_3$)$_3$, Ce:LiCs$_2$YCl$_6$, Ce:LiCs$_2$YBr$_6$, Ce:LiCs$_2$LaCl$_6$, Ce:LiCs$_2$LaBr$_6$, Ce:LiCs$_2$CeCl$_6$, Ce:LiRb$_2$LaBr$_6$ or so; and the inorganic phosphor particles comprising Li$_2$O—MgO—Al$_2$O$_3$—SiO$_2$—Ce$_2$O$_3$ based glass or so may be mentioned.

In the present invention, the wavelength which the inorganic phosphor particles emits the light is preferably within near ultraviolet region to visible light region, and more preferably it is visible light region from the point that transparency can be easily obtained when mixed with the resin which will be described in below.

In the present invention, the neutron-capturing-isotope which is comprised in the inorganic phosphor particles is preferably only lithium 6. By making the neutron-capturing-isotope which contributes to the neutron capture reaction to lithium 6 only, a constant energy can be provided to the inorganic phosphor particles constantly, and also extremely high energy of 4.8 MeV can be provided. Therefore, the neutron scintillator with little variation of the fluorescence intensity and particularly with excellent fluorescence intensity can be obtained.

Among the inorganic phosphor particles only comprising lithium 6 as the neutron-capturing isotope, a colquiriite type crystal expressed by a chemical formula of LiM$^1$M$^2$X$_6$ (note that, M$^1$ is at least one alkaline earth metal element selected from the group consisting of Mg, Ca, Sr and Ba; M$^2$ is at least one metal element selected from the group consisting of Al, Ga and Sc; X is at least one halogen element selected from the group consisting of F, Cl, Br and I) and comprising at least one lanthanoid element is preferable, and said colquiriite type crystal preferably further comprises at least one alkaline metal element.

As for further specific examples of the colquiriite type crystal, the inorganic phosphor particles comprising Eu:LiCaAlF$_6$, Eu,Na:LiCaAlF$_6$, Eu:LiSrAlF$_6$, and Eu, Na:LiSrAlF$_6$ are most preferable since it has high light yield, does not have deliquescency and is chemically stable.

The present invention uses the inorganic phosphor particles as the constituting element of the neutron scintillator in place of conventional bulk body of the inorganic phosphor in order to improve the n/γ discrimination ability of the neutron scintillator. Hereinafter, the mechanism of improvement of the n/γ discrimination ability by using said inorganic phosphor particle will be explained.

In general, when γ ray enters to the inorganic phosphor, high speed electrons are generated in the inorganic phosphor, then said high speed electrons provide the energy to the inorganic phosphor; thereby the inorganic phosphor emits the light. If the pulse-height output by said light emission is as high as the pulse-height of the incident neutrons, and each are not able to be discriminated, then γ ray is counted as the neutron, thus error occurs in the neutron count. Particularly, in case γ ray dose is high, the error caused by said γ ray increases, hence it becomes a significant problem.

The pulse-height output from the neutron detector by the γ ray incident depends on the energy provided by said high speed electrons, thus by lowering said energy, the pulse-height output when γ ray enters to the neutron scintillator can be reduced.

Here, the range distance of the high speed electrons moving in the scintillator caused by γ ray incident to the scintillator while providing the energy to the scintillator is several mm or so which is relatively long.

On the contrary, when the neutron enters the scintillator, as described in above, the secondary particle generated by the neutron capture reaction between the neutrons with lithium 6 and boron 10 which are included in the inorganic phosphor of said scintillator provides the energy to the inorganic phosphor, thereby the inorganic phosphor emits the light; however the range of the secondary particle is several μm to several tens μm which is shorter than the high speed electrons.

As for the first characteristic of the present invention, by making the inorganic phosphor into a particle form, above mentioned high speed electrons rapidly deviates from the inorganic phosphor particles, thereby the energy provided to the inorganic phosphor from the high speed electrons is lowered.

The size of the inorganic phosphor particles in the present invention is large enough so that almost all of the energy of the secondary particle generated by the neutron incident can be provided to the inorganic phosphor, but small enough that the high speed electrons can deviate by γ ray incident.

According to the examination by the present inventors, the shape of the inorganic phosphor particles preferably has the specific surface area of 50 $cm^2/cm^3$ or more, and particularly preferably 100 $cm^2/cm^3$ or more. Note that, in the present invention, the specific surface area of the inorganic phosphor particles refers to the surface area per unit volume of the inorganic phosphor particles.

Here, the specific surface area in the present invention is the surface area per unit volume, therefore (1) it tends to become larger as the absolute volume of the inorganic phosphor particles become smaller, and also (2) in case the shape is a complete sphere, the specific surface area is at the smallest, and on the other hand as the specific surface area of the inorganic phosphor particles becomes lager, the inorganic phosphor particle takes the shape farther away from the complete sphere. For example, when thinking of a cube having the sides extending in X axis direction, Y axis direction and Z axis direction; the specific surface area is smallest when the regular hexahedron has X=Y=Z; and the specific surface area becomes larger when any one of the length in the axis direction is made shorter and other sides are made longer in the axis direction although the volume is the same.

Further specifically, in case of the regular hexahedron having one side of 0.5 cm, the specific surface area is 12 $cm^2/cm^3$; but in case of the regular hexahedron (0.001 $cm^3$) having one side of 0.1 cm, then the specific surface area thereof is 60 $cm^2/cm^3$. Further, in case the thickness is made to 0.025 cm while the volume (0.001 $cm^3$) is the same, then the width and the height becomes 0.2 cm×0.2 cm, hence the specific surface area is 100 $cm^2/cm^3$.

In other words, when the specific surface area is large, this means that there is a part having at least one length extremely short in the axial direction. Further, the high speed electrons generated by said γ ray which runs in the direction of this short axis direction and in the direction close to this small axis direction quickly deviate from the crystal as mentioned in the above, hence the energy provided to the inorganic phosphor particles from the high speed electrons can be reduced.

The shape of the suitable inorganic phosphor particle based on said specific surface area is found from the above discussed findings and examinations; and when considering the energy provided to the inorganic phosphor particles from the high speed electrons, said specific surface area can be used as the indicator of the shape when taking into consideration that the inorganic phosphor particle takes various particle forms. Practically, said specific surface area is preferably 50 $cm^2/cm^3$ or more, more preferably 100 $cm^2/cm^3$ or more; thereby the neutron detector having excellent n/γ discrimination ability can be obtained.

Note that, in the present invention, the upper limit of said specific surface area is not particularly limited, but preferably it is 1000 $cm^2/cm^3$ or less. When the specific surface area exceeds 1000 $cm^2/cm^3$, that is when the length of at least one axis direction of the inorganic phosphor particles is too small, the secondary particle generated by the neutron capture reaction between neutrons with said lithium 6 and boron 10 may deviate from the inorganic phosphor particles before providing the entire energy to inorganic phosphor particles. In such event, the energy given to the inorganic phosphor particles by the neutron incident declines, thus the light emission intensity of the inorganic phosphor declines. In order to securely provide the entire energy of said secondary particles to the inorganic phosphor particles, and to enhance the light emission intensity of the inorganic phosphor; the specific surface area of the inorganic phosphor particles is particularly preferably 500 $cm^2/cm^3$ or less.

Note that, in the above, the word "axis" is used; however this was just used to show the space coordination position of X, Y and Z; and the inorganic phosphor particle used in the present invention is not to be limited to the cube comprising the sides in the particular axis direction.

Also, in case the inorganic phosphor particle has indefinite shape, said specific surface area can be easily obtained from the density and the specific surface area based on the weight which is obtained by using a density meter and BET specific surface area measuring device.

In the present invention, as the specific examples of the shape of the inorganic phosphor particles suitably used, particles of flat plate form, prism form, columnar form, sphere form or indefinite shape may be mentioned; wherein the shape having the equivalent spherical diameter in terms of specific surface area of 50 to 1500 μm, particularly preferably 100 to 1000 μm or so may be mentioned. From the point of easy production and easy purchase, those with the indefinite form obtained by pulverizing the bulk body are preferable.

The inorganic phosphor particles having the shape as discussed in the above can be obtained by a sieving. Sieving refers to the method of classification using an upper sieving having predetermined aperture and lower sieving having smaller aperture than the upper sieving; thereby separating the particle which passes through the upper sieving but substantially does not include particle passing through the lower sieving. In such sieving, the particle having shorter length in at least one axis with respect to the aperture of the sieving tends to pass through said sieving. Therefore, the inorganic phosphor particle having the shape wherein the high speed electrons excited by said γ ray can easily deviate is obtained by passing through the upper sieving; and the inorganic phosphor particle having the shape wherein the high speed electrons generated by said γ ray can easily deviate is separated on the lower sieving; further the inorganic phosphor particle having the shape wherein the secondary particle generated by said neutrons may deviate can be easily removed.

Specifically, by carrying out the sieving, the inorganic phosphor particles which passes through the aperture of 1000 μm but substantially free of the particle which passes through the aperture of 100 μm are separated; and said inorganic phosphor particles are preferably used for the neutron scintillator. Further, the inorganic phosphor particles which pass through the aperture of 500 μm but substantially free of the particle which passes through the aperture of 100 μm are separated; and said inorganic phosphor particles are preferably used for the neutron scintillator.

The neutron scintillator of the present invention comprises the resin composition comprising the resin and above discussed inorganic phosphor particles (hereinafter, it may be simply referred as "the resin composition"). As it can be understood from the above discussion, the inorganic phosphor particles of the present invention have small size compared to the generally used inorganic phosphor; hence the inorganic phosphor particles alone have poor neutron detection efficiency. Such problem can be solved by mixing the plurality of the inorganic phosphor particles with the resin, and by dispersing in said resin; thereby the neutron scintillator having excellent neutron detection efficiency while having said excellent n/γ discrimination ability can be obtained.

That is, the neutron detection efficiency of the neutron scintillator of the present invention depends on the content of the neutron-capturing-isotope derived from the inorganic phosphor particles in the resin composition, and the neutron detection efficiency can be enhanced by increasing said content. Note that, said neutron-capturing-isotope content refers to the number of the neutron-capturing-isotope derived from the inorganic phosphor particles averagely included per 1 mm$^3$ of the resin composition; and each of the content of lithium 6 ($C_{Li, C}$) and the content of boron 10 ($C_{B, C}$) can be obtained from the following equations (3) and (4) using the content of lithium 6 ($C_{Li, P}$) and the content of boron 10 ($C_{B, P}$) in the inorganic phosphor particles and the volume fraction of the inorganic phosphor particles (V) in the resin composition.

$$C_{Li, C} = C_{Li, P} \times (V/100) \quad (3)$$

$$C_{B, C} = C_{B, P} \times (V/100) \quad (4)$$

(In the above equations, $C_{Li, C}$ and $C_{B, C}$ are respectively the content of lithium 6 and boron 10 in the resin composition, $C_{Li, P}$ and $C_{B, P}$ are respectively the content of lithium 6 and boron 10 in the inorganic phosphor particles, and V is the volume fraction (V) [vol %] of the inorganic phosphor particles in the resin composition)

In the present invention, the content of the inorganic phosphor particles in the resin composition is not particularly limited; however by increasing the volume fraction of the inorganic phosphor particles in the resin composition, as obvious from said equation, the neutron detection efficiency can be improved. Therefore, the volume fraction of the inorganic phosphor particles in the resin composition is preferably 5 vol % or more, particularly preferably 10 vol % or more, and most preferably 20 vol % or more. The upper limit of the volume fraction of the inorganic phosphor particles against the entire resin composition is not particularly limited; however it is preferably less than 80 vol %, and more preferably less than 50 vol % considering the viscosity or so when producing the resin composition.

In the present invention, said resin composition may be used as the resin composition of the slurry form or the plate form wherein the inorganic phosphor particles and the filler particles are mixed with the liquid or viscus resin; or it may be used as the resin composition of solid form, wherein the inorganic phosphor particles, the filler particles and the liquid or viscus resin precursor are mixed, and then curing the resin precursor.

Here, in any embodiment using the slurry form, paste form, or solid form resin composition, it is preferable that the above mentioned inorganic phosphor particles are dispersed uniformly in the resin and that the space between the nearby inorganic phosphor particles with each other is wide. By making the space between the particles wider, it can prevent the total sum of the light emission from increasing which is caused by the high speed electrons deviated from one inorganic phosphor particle incident on other nearby inorganic phosphor particle thereby giving the energy to the inorganic phosphor particles (see FIG. 1).

Figure 3:
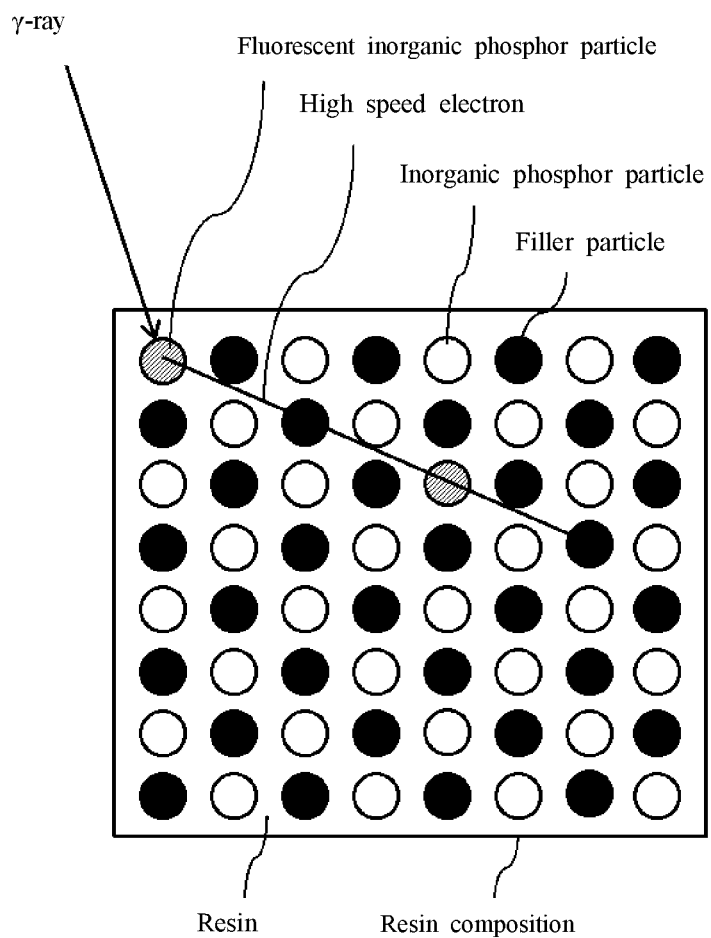
FIG. 3 is the schematic diagram of the resin composition comprising the inorganic phosphor particles and the resin.
Figure 4:
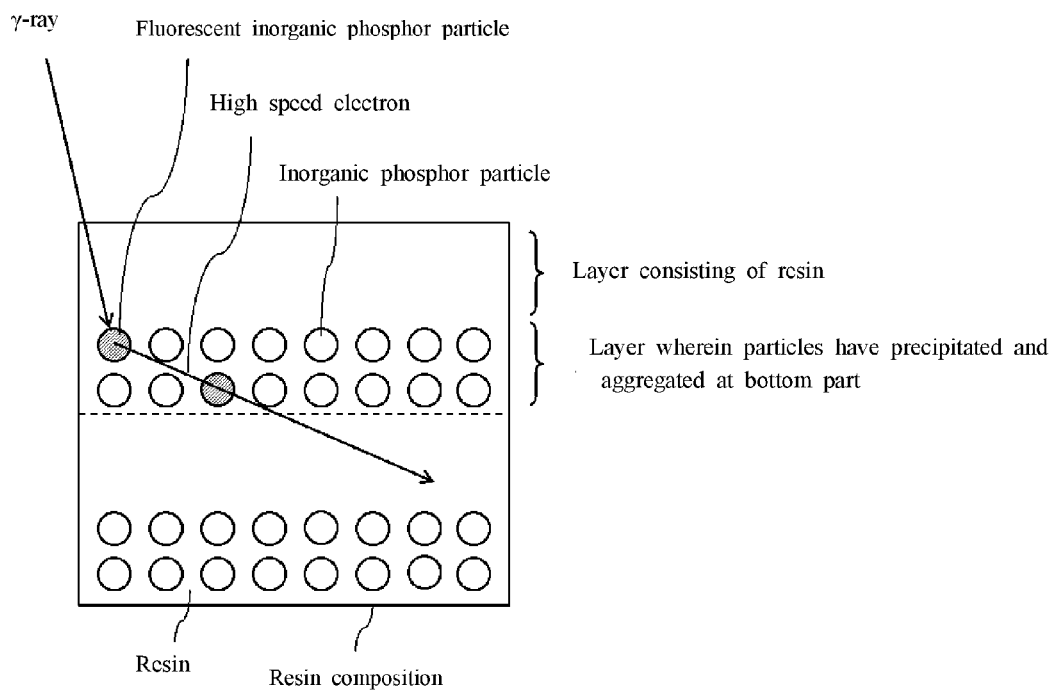
FIG. 4 is the schematic diagram of the resin composition comprising the inorganic phosphor particles and the resin.

However, in general, the specific gravity of the inorganic phosphor particles is larger than the specific gravity of the resin, hence when the inorganic phosphor particles and said liquid or viscus resin are mixed, the particles precipitates to the bottom and aggregates, thereby in some case it is difficult to maintain the space between the particles (see FIG. 2). In such case, the method of providing the thixotropic property to the resin composition by increasing the resin viscosity, thereby suppressing the precipitation of the particles; the method of blending the filler particle different from the inorganic phosphor particles to fill the space between the inorganic phosphor particles by the filler thereby maintaining the space between the inorganic phosphor particles (see FIG. 3); or the method of preparing plurality of the resin composition comprising the resin composition is thinner than the expected thickness, wherein said resin composition comprise a layer of which the particles are precipitated and aggregated at bottom part and the layer only comprising the resin on the top part, and maintaining these the macroscopic space between the particles by stacking these.

In the present invention, the neutron scintillator is preferably further mixed with the phosphor which does not comprise the neutron-capturing-isotope (hereinafter, it may be also referred as the neutron insensitive phosphor) in addition to the inorganic phosphor particles and the resin.

In such embodiment, the high speed electrons generated by γ ray incident provides the energy when reaching the neutron insensitive phosphor after deviating from said inorganic phosphor particles, thereby the neutron insensitive phosphor will fluoresce. That is, upon γ ray incident, the inorganic phosphor particles and the neutron insensitive phosphor are both provided with the energy; thereby these will fluoresce. On the other hand, upon neutron incident, the secondary particles generated by the inorganic phosphor particles do not deviate from the inorganic phosphor particles; hence only the inorganic phosphor particles fluoresce.

Here, by using the neutron insensitive phosphor having different fluorescence characteristic such as a fluorescence lifetime or the light emitting wavelength or so from said inorganic phosphor particles, neutrons and γ ray can be discriminated using said differences in the fluorescence characteristics. That is, the mechanism which can recognize the fluorescence characteristic differences is provided to the neutron detector, thereby when the fluorescence derived from the inorganic phosphor particles and the fluorescence derived from the neutron insensitive phosphor are both detected, it can be processed as the event of γ ray incident; and when only the fluorescence derived from the inorganic phosphor particles is detected, then it can be processed as the event of neutron incident. By going through such process, the neutron detector having excellent n/γ discrimination ability can be obtained.

As for specific examples of the mechanism which can recognize the differences of the fluorescence characteristics, the waveform analysis mechanism which can recognize the difference of the fluorescence lifetime between said inorganic phosphor particles and the neutron insensitive phosphor, and the wavelength analysis mechanism which can recognize the difference of the light emitting wavelength between the inorganic phosphor particles and the neutron insensitive phosphor or so may be mentioned.

Hereinbelow, said waveform analysis mechanism will be described further specifically. The waveform analysis mechanism comprises the preamplifier, the main amplifier, the waveform analyzer and the time-to-amplitude converter.

For the neutron detector of the present invention made by combining with said neutron scintillator and the photodetector, the signal output from the photodetector is input to the main amplifier via the preamplifier; thereby amplification and shaping are carried out. Here, amplification and shaping are carried out by the main amplifier, and the intensity of the signal output from the main amplifier increases over the time, however the time necessary for the increase (hereinafter, it may be referred as the rise time) reflects the fluorescence lifetime of said inorganic phosphor particles or the neutron insensitive phosphor, and the shorter the fluorescence lifetime is, the shorter the rise time is.

In order to analyze the rise time, the signal being amplified and shaped by the main amplifier is input to the waveform analyzer. The waveform analyzer time-integrates the signal input from said main amplifier, and output the logic signal when the signal intensity being time-integrated exceeds the predetermined threshold. Here, two steps of the thresholds are set in the waveform analyzer; and these are output as the first logic signal and the second logic signal with time interval.

Next, two logic signals output from the waveform analyzer are input to the time-to-amplitude converter (TAC), then the time difference of two logic signals output from the waveform analyzer are output by converting to the pulse amplitude. The pulse amplitude reflects the time intervals between the first logic signal and the second logic signal which are output from the waveform analyzer, that is, it reflects the rise time.

As it can be understood from the above, the smaller the pulse amplitude output from the time-to-amplitude converter is, the shorter the rise time is, and therefore it is recognized that the fluorescence lifetime of said inorganic phosphor particles or the neutron insensitive phosphor is short.

Hereinafter, said wavelength analysis mechanism will be described further specifically. The wavelength analysis mechanism comprises the optical filter, the second photodetector connected to the neutron scintillator via said optical filter, and the discrimination circuit.

In the present embodiment, a part of the light released from the neutron scintillator is guided to the first photodetector without going through said optical filter, and other parts of the light is guided to the second photodetector via the optical filter.

Here, the inorganic phosphor particles emit the light in the wavelength of A nm, and the neutron insensitive phosphor emits the light in the wavelength of B nm which is different from A nm. Then, as discussed in the above, the inorganic phosphor particles and the neutron insensitive phosphor both emit the fluorescent light upon γ ray incident, hence the light of A nm and B nm will be emitted from the neutron scintillator; but the inorganic phosphor particles will only emit the fluorescent light upon the neutron incident, thus the light of A nm will only be emitted.

In the present embodiment, said optical filter is the filter which blocks the light having the wavelength of A nm, and transmits the light having the wavelength of B nm. Therefore, the light of A nm emitted from the neutron scintillator when neutrons are irradiated will reach the first photodetector, but it will not reach the second photodetector because it is blocked by optical filter. On the other hand, among the lights emitted from the scintillator when γ ray was irradiated, it is the same for the light of A nm such as in case of said neutron irradiation, however the light of B nm will reach the first photodetector, and it will also reach to the second photodetector since it can transmit through the optical filter.

Therefore, when the light of A nm enters to the first photodetector and outputs the signal from said photodetector, it will be considered as the event of neutrons if the signal from the second photodetector is not output; however when the light of B nm enters the second photodetector and outputs the signal from the second photodetector, then it can be considered as the event of γ ray; thereby it can be discriminated.

Note that, in the present embodiment, as mentioned in the above, the discrimination circuit is provided to discriminate neutrons and γ ray. The discrimination circuit works by synchronizing to the signal from said first photodetector; and it is the circuit to determine whether the signal is from the second photodetector when the signals are output from the photodetector. As the specific examples of the discrimination circuits, the anticoincidence circuit and the gate circuit or so may be mentioned.

As for specific examples of the neutron insensitive phosphor, 2,5-Dipheniloxazole, 1,4-Bis(5-phenyl-2-oxazolyl)benzene, 1,4-Bis(2-methylstyryl)benzene, anthracene, stilbene and naphthalene, and the organic phosphor of derivatives thereof or so may be mentioned. Said organic phosphor generally has shorter fluorescence lifetime compared to said inorganic phosphor particles, hence it can be suitably used to improve the n/γ discrimination ability by using the different fluorescence lifetime.

The content of the neutron insensitive phosphor can be set appropriately within the range which can exhibit the effect of the present invention, however preferably it is 0.01 wt % or more, and particularly preferably 0.1 wt % or more with respect to the resin. By making the content to 0.01 wt % or more, the neutron insensitive phosphor can be excited efficiently by the energy provided from said high speed electrons, and the intensity of the light emission from the neutron insensitive phosphor increases. Also, the upper limit of the content of the neutron insensitive phosphor is not particularly limited, however in order to prevent the light emission intensity of the neutron insensitive phosphor from declining due to the concentration quenching, it is preferably 5 wt % or less and particularly preferably 2 wt % or less with respect to the resin. By setting the content of the neutron insensitive phosphor within the range, the light emission intensity from the neutron insensitive phosphor increases, and neutrons and γ ray becomes easy to discriminate by using the difference of the fluorescence characteristics from said inorganic phosphor particles.

The production method of said inorganic phosphor particles is not particularly limited, and the method of pulverizing and classifying the bulk body having larger shape than the particles of said suitable shape to obtain the particles with the desired shape; or the method of directly obtaining the inorganic phosphor particles having suitable shape by the particle synthesis reaction using the solution as the starting material or so may be mentioned.

Among such production methods, the method of pulverizing and classifying the bulk body is preferable since the production efficiency is high and the desired particles can be obtained inexpensively. The method of pulverizing the bulk body is not particularly limited, and the known pulverizers such as a hummer mill, a roller mill, a rotary mill, a ball mill, or a beads mill or so can be used without particular limitation. When producing the inorganic phosphor particles, so called fine powder which has extremely large specific surface area is suppressed from being generated, and to obtain the inorganic phosphor particles having the specific surface area preferably 1000 cm$^2$/cm$^3$ or less, and particularly preferably 500 cm$^2$/cm$^3$ as discussed in above, the hummer mill and the roller mill are particularly preferably used.

Also, as the method of classifying the particles obtained by pulverizing said bulk body, the known classifying method such as a dry sieving, a wet sieving or an air sieving or so may be employed without particular limitation.

Among said classifying methods, as discussed in the above, the classifying method is preferably carried out by sieving, since the particles having suitable specific surface area can be easily obtained. Also, due to the sieving, the classification can be carried out efficiently using inexpensive equipment.

In the present invention, the resin composition is preferably transparent in order to efficiently guide the fluorescent light emitted from the inorganic phosphor particles in the resin composition to the wavelength converting part comprising the wavelength fiber or the wavelength converting sheet which will be described in below.

Therefore, the resin which is the second essential component of the resin composition of the present invention is preferably transparent resin. Specifically, the internal transmittance of the resin at the emission wavelength of said inorganic phosphor particle is preferably 80%/cm or more, and particularly preferably 90%/cm or more. As the specific examples of said resin, a silicone resin, a fluorine resin, poly(meth)acrylate, polycarbonate, polystyrene, polyvinyl toluene and polyvinyl alcohol or so may be mentioned. Also, for the purpose of regulating the refractive index and the intensity or so, plurality of resins can be mixed for use.

Also, among the resins, the transparent resin wherein the refractive index at the emission wavelength of said inorganic phosphor particles close to the refractive index of the inorganic phosphor particles is preferably used. Specifically, the ratio of the refractive index of the transparent resin with respect to the refractive index of the inorganic phosphor particles is preferably 0.95 to 1.05, and most preferably 0.98 to 1.02. By setting the ratio of the refractive index within said range, the light scattering at the boundary between the inorganic phosphor particles and the resin can be suppressed, and the transparency of said resin composition can be enhanced. Note that, said refractive index is that of within the temperature range in which the scintillator of the present invention is used. For example, in case of using the scintillator of the present invention at near 100° C., said refractive index ratio needs to be determined at 100° C.

The refractive index at the emission wavelength of said inorganic phosphor particles can be measured by using the refractometer. In general, as a light source of the refractometer, d ray (587.6 nm) of He lamp, γ ray (706.5 nm) of the same, F ray (486.1 nm) of H2 lamp, C ray (656.3 nm) of the same, i ray (365.0 nm) of Hg lamp, h ray (404.7 nm) of the same, g ray (435.8 nm) of the same, and e ray (546.1 nm) of the same can be used. Among these light sources, the light source of short wavelength side and long wavelength side than the emission wavelength of the inorganic phosphor particles is appropriately selected; then the wavelength of each light source and the refractive index measured at the wavelength are respectively placed into Sellmeier's equation (6) to obtain the constant A and B. Then, the emission wavelength of the inorganic phosphor particles is placed into the same equation thereby the expected refractive index can be obtained. Note that, when the emission wavelength of the inorganic phosphor particles matches the wavelength of any one of said light sources, the refractive index may be determined by using the light sources. Also, when measuring such refractive index, the bulk body of the inorganic phosphor and the bulk body of the resin having the shape suitable for the measurement may be used.

$$n^2 - 1 = A\lambda^2/(\lambda^2 - B) \tag{6}$$

(In the above equation, n is the refractive index at the wavelength λ, and A and B are constants.)

In the present invention, the resin composition may be the slurry form or paste form wherein the inorganic phosphor particles and the liquid or viscus resin are mixed; or the resin composition may be the solid resin composition wherein the inorganic phosphor particles are mixed with the liquid or viscus resin precursor then curing said resin precursor is cured.

The production method of said resin composition is not particularly limited; however the specific production method will be described as an example.

In case of using the slurry form or paste form as the resin composition of the present invention, first the inorganic phosphor particles and the liquid or viscus resin are mixed. For the mixing procedure, the mixer of known type such as a propeller mixer, a planetary mixer, or a butterfly mixer or so can be used without particular limitation.

Next, the bubble generated in the resin composition during the mixing procedure is defoamed. During such defoaming procedure, the defoaming apparatus such as a vacuum defoaming apparatus, or a centrifugal defoaming apparatus or so can be used without particular limitation. By carrying out such defoaming procedure, the light scattering due to the bubbles can be suppressed; hence the internal transmittance of the resin composition can be enhanced.

Note that, during said mixing procedure and the defoaming procedure, in order to reduce the viscosity of the resin composition and to efficiently carry out the mixing and the defoaming, the organic solvent may be added to the resin composition.

In case of using the solid form resin composition as the resin composition of the present invention, the mixing procedure and the defoaming procedure same as the case of using the liquid or viscus resin precursor discussed in above are carried out. Next, the obtained mixture of the inorganic phosphor particles and the resin precursor are introduced into the mold having the desired shape, and the resin precursor is cured. The method for curing is not particularly limited; however the method of polymerizing the resin precursor by heat applying, ultraviolet irradiation or catalyst addition or so is preferable.

Here, the resin composition of the present invention can be used in a slurry form or paste form, and also it can be molded by the mold having a desired shape even in case the resin composition is solid form; hence it is easy to form into any shape. Therefore, according to the present invention, the neutron scintillator having a rod form, a hollow tube form, or with a large area can be provided depending on the purpose of use.

The neutron scintillator of the present invention is characterized by the resin based complex comprising the wavelength converting part comprising the wavelength converting fiber or the wavelength converting sheet.

Figure 5:
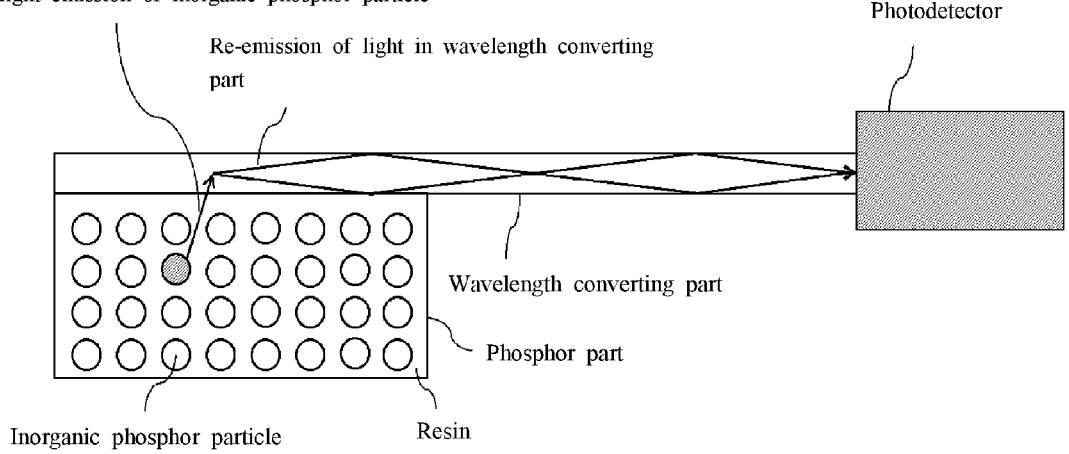
FIG. 5 is the schematic diagram of the neutron detector according to the present invention.

The wavelength converting part functions as the light guide for guiding the light emission from the inorganic phosphor particles in said resin composition to the photodetector. The mechanism of the wavelength converting part will be described using FIG. 5. When the light emitted from the inorganic phosphor particles reaches to the wavelength converting part, the wavelength converting part absorbs the light emission of the inorganic phosphor particles, then it re-emits the light at the wavelength different from the original wavelength. The light emission of this wavelength converting part occurs isotropically, but the light emitted in certain angle against the outer face of the wavelength converting part propagates while being totally reflected at the inside of the wavelength converting part, and it reaches to the end part of the wavelength converting part. Further, by placing the photodetector at the end part of the wavelength converting part, the light emission from the inorganic phosphor particles can be collected via the wavelength converting part.

Said wavelength converting fiber or the wavelength converting sheet is those wherein the phosphor is comprised in the substrate made of plastic or glass, and molded into a fiber form or sheet form; and due to the effect of the phosphor, it absorbs the light having certain wavelength, then re-emits at the different wavelength than the original wavelength. The material of the wavelength converting fiber or the wavelength converting sheet is not particularly limited, however in general, those wherein the organic phosphor with various absorption wavelength comprised in the substrate made of plastics such as polystyrene, polymethylmethacrylate, and polyvinyl toluene or so are commercially available. In the present invention, it is preferable to select the wavelength converting fiber or the wavelength converting sheet with the absorption wavelength which matches the emission wavelength of the inorganic phosphor particle. The shape of wavelength fiber or the wavelength converting sheet is not particularly limited; however as the wavelength converting fiber of circular shape having the diameter of 0.1 to 5 mm at the cross section thereof, and as for square shape having one side of 0.1 to 5 mm can be preferably used; and as the wavelength converting sheet, those with the thickness of 0.1 to 5 mm can be used preferably. Also, in order to increase the efficiency of propagating the light at the inside of the wavelength converting part, those using the substrate comprising said organic phosphor as the core material, and using the clad material at the surface thereof having lower refractive index than the core material is preferable.

In general, in case of collecting the light emission from the phosphor part by the wavelength converting part, the collection efficiency of the light is poor. That is, the light amount which reaches to the photodetector placed at the end part of the wavelength converting part is generally only several % of the light amount emitted from the phosphor due to; (1) the loss caused by a part of the light emission from the phosphor part unable to reach to the wavelength converting part and therefore quenching, (2) the loss caused when the wavelength converting part absorbs the light emission from the phosphor part and re-emitting the light, and (3) the loss caused by the light emission of the wavelength converting part failing to propagate at the inside of the wavelength converting part and therefore scattering or so.

As such, in case the light amount which reaches to the photodetector is low, naturally the light amount will vary significantly, hence as discussed in above, it becomes difficult to discriminate neutrons from γ ray by the threshold set by the pulse-height, and the counting error due to γ ray becomes significant. However, the inorganic phosphor particles of the present invention has significantly low pulse-height caused by γ ray, hence even in case the light amount which reaches said photodetector is little, a sufficient n/γ discrimination ability can be exhibited.

In the present invention, said wavelength converting part is preferably contained in the phosphor part. By taking such embodiment, the above mentioned (1) the loss caused by a part of the light emission from the phosphor part unable to reach to the wavelength converting part and therefore quenching can be reduced significantly, thereby the collecting efficiency of the light improves. That is, in case the wavelength converting part is placed at the outer peripheral of the phosphor part, once the light emission generated at the phosphor part emits out from the phosphor part, then it is necessary to incident on to wavelength converting part again via the intermediate phase. Conventionally, various examinations has been carried out to reduce the loss during such steps (for example see the patent document 4), however there was still a room for improvement. On the contrary to this, in case said wavelength converting part is contained in the phosphor part, the light emission from the phosphor part incidents on the wavelength converting part without the intermediate phase, thus the loss can be reduced significantly. Note that, the wavelength converting part may be contained in at any position of the phosphor part, however preferably it is placed at the center than the peripheral of the phosphor part since the collection efficiency of the light is particularly improved.

Also, for the present embodiment, in the emission wavelength of the inorganic phosphor particles, the ratio of the refractive index of the wavelength converting part against the refractive index of the resin of the phosphor part is preferably 0.95 or more. The light emission generated by the inorganic phosphor particles incidents on the wavelength converting part via the resin, however the light which incidents on the wavelength converting part in the incident angle exceeding certain critical angle will be totally reflected at the boundary between the resin and the wavelength converting part thus it can not enter. By making the ratio of said refractive index to 0.95 or more, said critical angle can be about 70 degrees angle or larger, thereby the efficiency of the incident on the wavelength converting part from the phosphor part can be enhanced. By making the ratio of the refractive index to 1 or more, the total reflection at the boundary between said resin and the wavelength converting part can be prevented, thus it is particularly preferable. Further, by making the ratio of the refractive index to 1.05 or more, it increases the efficiency of propagating the light re-emitted at the wavelength converting part at the inside of the wavelength converting part while undergoing total reflection at the boundary between the wavelength converting part and the phosphor part; thus the above mentioned (3) the loss caused by the light emission of the wavelength converting part failing to propagate at the inside of the wavelength converting part and therefore scattering or so can be reduced, hence it is most preferable.

Note that, by setting the ratio of the refractive index as mentioned in the above, it is also effective in case the wavelength converting part is placed at the outer peripheral of the phosphor part. That is, by using the intermediate phase having the refractive index which is between the phosphor part and the wavelength converting part, the emission to the intermediate phase from the phosphor part, and the incident on the wavelength converting part from the intermediate phase improves as similar to discussed in the above. When the resin in said phosphor part is used as the intermediate phase, the total reflection of the light does not occur at the boundary between the phosphor part and the intermediate phase, thereby the effect as same as in the case the wavelength converting part is contained in the phosphor part can be obtained, thus it is most preferable.

As discussed in the above, the wavelength converting part generally comprises polystyrene, polymethylmethacrylate, and polyvinyl toluene or so, and the refractive index ($n_D$) thereof at the sodium D ray is about 1.5 to 1.6. Therefore, in order to satisfy the condition of the ratio of said refractive index, preferably the low refractive index resin having lower refractive index than these is used. As such low refractive index resin, a silicone resin, a fluorinated silicone resin, a phenyl silicone resin and a fluororesin can be preferably used, and those having $n_D$ of about 1.3 to 1.5 are commercially available. Also, as discussed in the above, the refractive index of the inorganic phosphor particles is preferably as low as said low refractive index resin. As such inorganic phosphor particles, a colquiriite type crystal expressed by the chemical formula of $LiM^1AlF_6$ (note that, $M^1$ is at least one alkaline earth metal element selected from the group consisting of Mg, Ca, Sr and Ba), and comprising at least one lanthanoid element is preferable, and said colquiriite type crystal preferably further comprises at least one alkaline metal element. Said colquiriite type crystal has $n_D$ of about 1.4 or so, thus the condition of said ratio of the refractive index can be satisfied easily. Note that, the refractive index at the sodium D ray is used as an example for the convenience; however it is the same for the emission wavelength of the inorganic phosphor.

Also, as the wavelength converting part is contained in the phosphor part, the used amount of the wavelength converting part can be reduced, and also the structure of the resin based complex can be made simple. That is, in case the wavelength converting part is placed at the outer peripheral of the phosphor part, in order for the light emitted from the phosphor part to efficiently incident on the wavelength converting part, it is necessary to collect the light emitted from the phosphor part to the wavelength converting part by completely covering the face where the light emits from the phosphor part with large amount of the wavelength converting part, or by using reflector having the complicated shape as shown in Fig.1 of the patent document 5. On the contrary, in case said wavelength converting part is contained in the phosphor part, the light emitted from the phosphor part can efficiently incident on the wavelength converting part by simply sealing the light to the inside of the phosphor part using conventionally known simple means such as covering the outer peripheral of the phosphor part by reflector or so since the light running in all directions inside the phosphor part eventually reach the wavelength converting part.

In the present invention, due to the effect discussed in the above, the used amount of the wavelength converting part can be reduced, however in case the used amount is too little, the loss of the light amount may increase thus it is preferable to use appropriate amount. According to the keen examination by the present inventors, the appropriate used amount of the wavelength converting part can be determined by the ratio of the cross section area of the wavelength converting part against the cross section area of the phosphor part at the cross section which is perpendicular to the body axis of the wavelength converting fiber and to the sheet face of the wavelength converting sheet. In order for the light emitted from the phosphor part to efficiently incident on the wavelength converting part, said ratio of the cross section area is preferably 0.001 or more, and particularly preferably 0.01 or more. On the other hand, in order to reduce the used amount of the wavelength converting part and to reduce the production cost by simplifying the structure of the resin based complex, said ratio of the cross section area is preferably 1 or less, and particularly preferably 0.1 or less.

Note that, in case plurality of the wavelength converting parts are present, the sum of the cross section area of the plurality of the wavelength converting part (the total cross section area) is obtained, and the ratio of the total cross section area of the wavelength converting part against the cross section area of the phosphor par may be within said range. However, according to the findings by the present inventors, the light can incident on the phosphor part further efficiently by partitioning the phosphor part by reflector to seal the light into the area as small as possible so that for each wavelength converting part said cross section area is satisfied.

The neutron scintillator of the present invention is obtained by combining said wavelength converting part and the phosphor part comprising said resin composition.

In the present invention, in case of using the slurry form or paste form resin composition, the resin composition may be placed in the transparent container and the wavelength converting part may be placed at the outer peripheral of the container; or the resin is placed in the container then the wavelength converting part can be inserted into the resin composition in the container, thereby the neutron scintillator of the present invention can be made. In case of using the solid form resin composition, the wavelength converting part may be placed at the outer peripheral of the solid form resin composition, or the wavelength converting part is inserted to the mixture of the inorganic phosphor particle and resin precursor, as discussed during the production method of said resin composition, then the resin precursor is cured, thereby the neutron scintillator of the present invention can be made.

In the present invention, in case the wavelength converting part is contained in the phosphor part, as discussed in the above, the outer peripheral of the phosphor part is preferably covered by the reflector, thereby the light is sealed. Also, in case the wavelength converting part is placed at the outer peripheral of the phosphor part, the optical grease is filled between the wavelength converting part and the phosphor part, thereby preferably the outer peripheral of the resin based complex comprising the wavelength converting part and the phosphor pat is covered by the reflector. As such reflector, the known materials can be used without particular limitation, however the reflector such as unbaked polytetrafluoroethylene, or white pigment of barium sulfate is suitable.

The neutron scintillator of the present invention can be a flexible neutron scintillator by employing a flexible container as the container in case of using said slurry form or paste form resin composition, or by employing a flexible resin in case of using the solid resin composition. Such flexible neutron scintillator can be suitably used particularly as the neutron detector which is used by attaching to human body.

The neutron detector of the present invention is made by combining said neutron scintillator and the photodetector. That is the light emitted from the phosphor part which is caused by the neutron incident is guided to the photodetector via the wavelength converting part. The light reached to the photodetector is converted into an electrical signal by the photodetector, and the neutron incident is counted as the electrical signal, thereby it can be used for the neutron counting or so. In the present invention, the photodetector is not particularly limited, and the conventionally known photodetector such as a photomultiplier tube, a photodiode, an avalanche photodiode, a Geiger mode avalanche photodiode, and a micro PMT or so can be used without any particular limitation.

Note that, in the wavelength converting part, the end face facing the photodetector is the light emission face, and said light emission face is preferably a smooth face. By having such light emission face, the light generated by the neutron scintillator can efficiently enter into the photodetector.

The method of producing the neutron detector by combining the neutron scintillator and the photodetector of the present invention is not particularly limited, and for example by optically adhering the light emission face of the wavelength converting part to the light detection face of the photodetector, and then by connecting the power source and a signal reading circuit to the photodetector thereby the neutron detector can be produced. Note that, said signal reading circuit is generally constituted from the preamplifier, the shaping amplifier and the multiple pulse height analyzer or so.

Also, using the neutron scintillator comprising plurality of said wavelength converting parts, and using the position sensitive photodetector as the photodetector, the position resolution can be provided to the neutron detector.

EXAMPLE

Here, the present invention will be described in detail by referring to the examples; however the present invention is not to be limited thereto. Also, the characteristic combination described in the examples is not necessarily the essential feature for attaining the present invention.

REFERENCE EXAMPLE 1

In the present invention, the neutron detector was produced using the inorganic phosphor particles comprising Eu:LiCaAlF$_6$ crystal doped with 0.04 mol % of Eu.

The Eu:LiCaAlF$_6$ crystal comprises only lithium 6 as the neutron-capturing-isotope. The density of the Eu:LiCaAlF$_6$ crystal was 3.0 g/cm$^3$, the weight fraction of lithium was 3.2 wt %, and the isotope ratio of lithium 6 in the source material was 95%, therefore the content ($C_{Li,\ P}$) of the neutron-capturing-isotope thereof was 9.1×10$^{18}$ atom/mm$^3$ according to the aforementioned equation (1).

Also, the radiation was irradiated to the Eu:LiCaAlF$_6$ crystal and the light emission wavelength of the Eu:LiCaAlF$_6$ crystal measured by the fluorescence photometer was 370 nm. Note that, the radiation was α ray which is one of the secondary particles generated at the neutron irradiation, and $^{241}$Am was used as the radiation source.

When producing the inorganic phosphor particles made of Eu:LiCaAlF$_6$ crystal, first the bulk body of said Eu:LiCaAlF$_6$ crystal having an indefinite shape of about 2 cm square was prepared, then after pulverizing the bulk body by hummer mill, the dry classification was carried out to collect those passed through the upper filter of 300 μm and remained at the lower filter of 150 μm thereby the inorganic phosphor particles having indefinite form were obtained.

When the weight based specific surface area of the inorganic phosphor particles were measured using BET specific surface area meter, it was 0.01 m$^2$/g. Therefore, the surface area per unit volume was 300 cm$^2$/cm$^3$.

In the present example, the filler particle comprising LiCaAlF$_6$ crystal and non-fluorescent was used. The density of LiCaAlF$_6$ crystal was 3.0 g/cm$^3$, the weight fraction of lithium was 3.7 wt %, and the isotope ratio of lithium 6 in the raw material was 7.6%, therefore the neutron-capturing isotope content ($C'_{Li,\ P}$) thereof according to the above mentioned equation (1) was 0.73×10$^{18}$ atom/mm$^3$. Also, the specific weight of the LiCaAlF$_6$ crystal was as same as that of Eu:LiCaAlF$_6$ crystal, which was 3.0 g/cm$^3$.

As the filler particle comprising LiCaAlF$_6$ crystal, those pulverized and classified the bulk body of LiCaAlF$_6$ crystal was used as similar to the inorganic phosphor particle.

In the present reference example, the silicone resin (KER-7030 made by Shin-Etsu Chemical Co., Ltd) was used as the resin. The resin was formed of 2 solutions that of A solution and B solution, and the equal amount of 2 solutions were mixed to prepare the resin precursor, then the resin precursor can be used for heat-curing. Also, the resin was the transparent resin having the internal transmittance of 95%/cm at 370 nm which is the emission wavelength of said Eu:LiCaAlF$_6$ crystal.

The refractive index of said Eu:LiCaAlF$_6$ crystal, LiCaAlF$_6$ crystal and said silicone resin at 370 nm under the room temperature were measured by the refractometer. Note that, for the measurement of the refractive index, the bulk body of Eu:LiCaAlF$_6$ crystal, the bulk body of LiCaAlF$_6$ crystal and the bulk body of the resin having predetermined shape suitable for the measurement were used. As the light source of the refractometer, i ray (365.0 nm) and h ray (404.7 nm) of Hg lamp were used. The wavelength of each light source and the refractive index measured at said wavelength were input to said Sellmeier's equation (6) to obtain the constants A and B, then the refractive index at 370 nm was obtained using the same equation. As a result, the refractive index of Eu:LiCaAlF$_6$ crystal, LiCaAlF$_6$ crystal and the silicone resin at 370 nm were 1.40, 1.40 and 1.41 respectively; and the ratio of the refractive index of the transparent resin against the refractive index of the inorganic phosphor particles, and the ratio of the refractive index of the transparent resin against the refractive index of the filler particles were both 1.01.

10.0 g of the inorganic phosphor particles comprising said Eu:LiCaAlF$_6$ crystal, 10.0 g of the filler particles comprising LiCaAlF$_6$ crystal and 10.0 mL of the resin precursor of the silicone resin wherein the equal amount of A solution and B solution were mixed in advance were placed in the mixing container. Then, thoroughly mixed using stirring rods, and the air bubbles generated in the mixture during the mixing procedure was defoamed using vacuum defoaming apparatus.

Then, the mixture was placed in the mold made of the polytetrafluoroethylene of the size of about 5 mm×5 mm×50 mm, then the resin precursor was cured by applying the heat at 60° C. for 24 hours, thereby the resin composition including the inorganic phosphor particle and the filler particle was obtained. The resin composition was transparent.

The shape of the resin composition was 5 mm×5 mm×40 mm, and the volume was 1.0 mL. The inorganic phosphor particles and the filler particles are included 0.60 g respectively in the resin composition, and from the density of the inorganic phosphor particles and the filler particles, the volumes were 0.20 mL for both. Therefore, the volume fraction (V) of the inorganic phosphor particles and the volume fraction (V') of the filler particles against the resin composition were both 20 vol %. Therefore, the content ($C_{Li,\ c}$) of the neutron-capturing isotope derived from the inorganic phosphor particles in the resin composition and the content ($C'_{Li,\ c}$) of the neutron capturing-isotope derived from the filler particles were 1.8×10$^{18}$ atom/mm$^3$ and 0.15× 10$^{18}$ atom/mm$^3$; and $C'_{Li,\ c}$ was ¹⁄₁₂ of $C_{Li,\ c}$. Note that, the volume fraction of the filler particles against the inorganic phosphor particles was 100 vol %.

Said resin composition was used as the neutron scintillator and the neutron detector was made without using the wavelength converting part and directly connecting to the photodetector. First, one face having the diameter of 5 mm×40 mm of said neutron scintillator was set as the light emission face, and the reflector made of unbaked polytetrafluoroethylene sheet was provided to the faces other than the light emission face. Then, the photomultiplier tube (H6521 made by Hamamatsu Photonics K.K.) as the photodetector was prepared, and after the light detection face of said photomultiplier tube and the light emission face of said neutron scintillator were optically adhered, the neutron scintillator and the photodetector were covered by a black sheet for light shielding.

Said photomultiplier tube was connected to the power source, and the preamplifier, the shaping amplifier, and the multiple pulse height analyzer were connected as the signal reading circuit from the photomultiplier tube side, thereby the neutron detector of the present invention was obtained.

The performance of the neutron detector of the present invention was evaluated by the following method. Cf-252 having the radio activity of 2.4 MBq was placed at the center of the high density polyethylene having 20 cm cubic shape, and then neutrons from the Cf-252 were irradiated by moderating by the high density polyethylene.

Using the power source connected to the photomultiplier tube, the high voltage of −1300 V was applied to the photomultiplier tube. By the neutron incident, the light emitted from the neutron scintillator was converted to the pulse form electrical signal by the photomultiplier tube, and the electrical signal was input to the preamplifier, shaping amplifier and multiple pulse height analyzer. The pulse height spectrum was made by analyzing the electrical signal which was input to the multiple pulse height analyzer.

Next, as same as the above, the pulse-height spectrum was made except that Co-60 having the radio activity of 0.83 MBq was placed at the position 5 cm from the neutron scintillator, and irradiating γ ray from said Co-60 in place of the neutrons. The dose of γ ray at the position 5 cm from Co-60 having the radio activity of 0.83 MBq was 10 mR/h which is extremely high dose.

Figure 6:
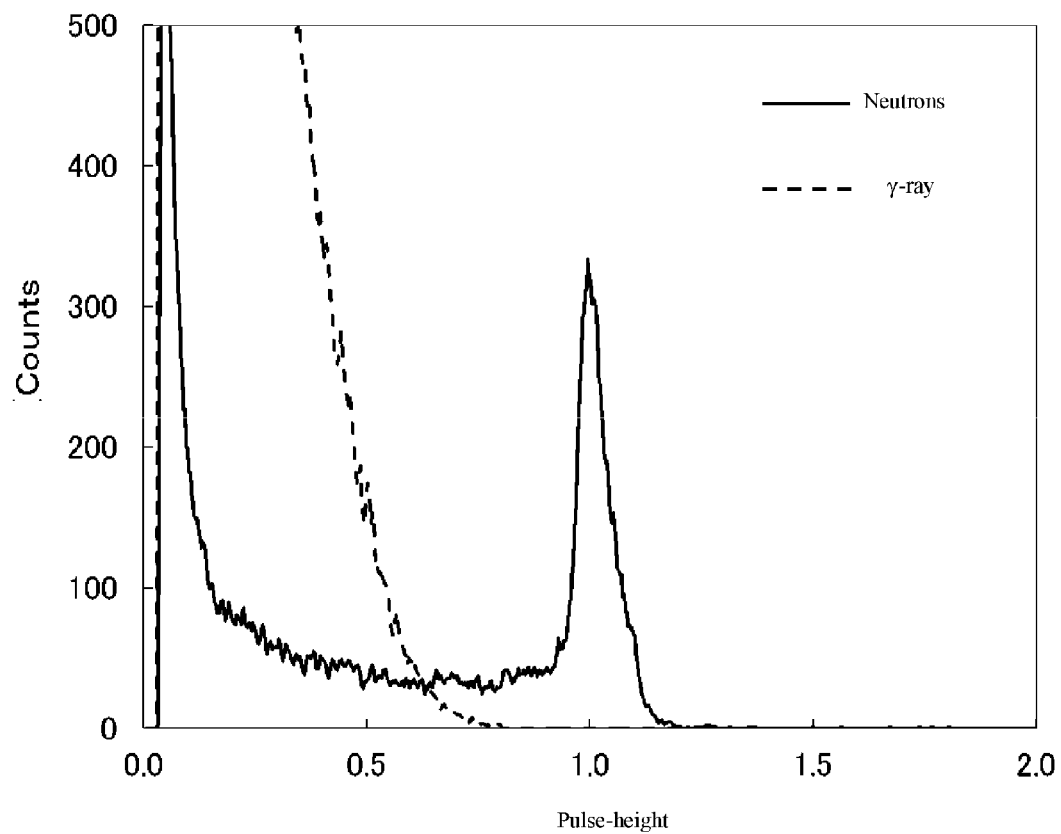
FIG. 6 is the pulse-height spectrum obtained from the example 1.

The obtained pulse-height spectrum is shown in FIG. 6. The bold line and the broken line of FIG. 6 are the pulse-height spectrum under neutrons and γ ray respectively. Note that, in said pulse-height spectrum, the horizontal axis is shown as the relative value taking the pulse-height of the neutron peak as 1.

A clear neutron peak can be confirmed from FIG. 6, and also the pulse-height of the electrical signal generated by γ ray incident is extremely low compared to the pulse-height of the neutron peak, thus it is obvious that γ ray and neutrons can be easily discriminated.

EXAMPLE 1

Figure 7:
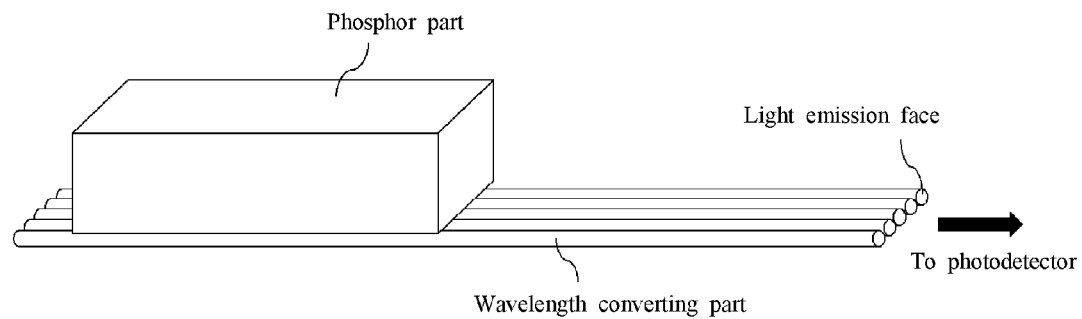
FIG. 7 is the schematic diagram of the resin based complex of the example 1.

The neutron scintillator comprising the resin based complex of the present invention was produced using the resin composition having the size of 5 mm×5 mm×40 mm obtained in the reference example 1 as the phosphor part, and five of the wavelength converting parts comprising the wavelength converting fibers were placed at the outer peripheral of the phosphor part as shown in FIG. 7. As the wavelength converting fiber, B-1 made by KURARY CO., LTD was used. For the wavelength converting fiber, polystyrene comprising the organic phosphor was used as the core material, and polymethylmethacrylate was provided at the outer peripheral thereof as the clad material; and has the absorption at 370 nm which is the emission wavelength of the inorganic phosphor made of $Eu:LiCaAlF_6$ crystal. The refractive index at 370 nm of the core material and the clad material were 1.64 and 1.51 respectively. The optical grease was filled to the space between the phosphor part and the wavelength converting part, and the outer peripheral of the resin based complex comprising the wavelength converting part and the phosphor part was covered by the reflector made of unbaked polytetrafluoroethylene sheet, thereby the neutron scintillator of the present invention was obtained.

The end face of the wavelength converting fiber of the neutron scintillator was mirror polished to obtain the light emission face, and the light emission face and the light detection face of the photomultiplier tube were optically adhered by the optical grease, then the neutron scintillator and the photodetector were covered by a black sheet for light shielding.

Figure 8:
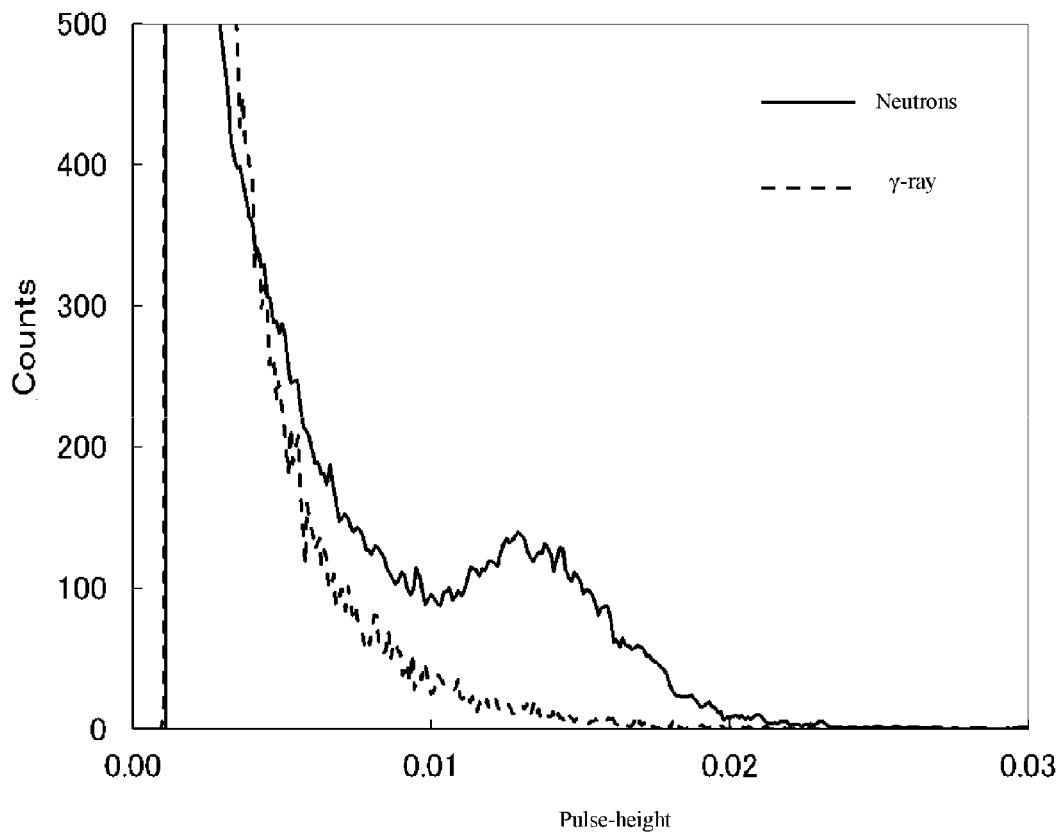
FIG. 8 is the pulse-height spectrum obtained from the example 1.

The pulse height-spectrum made as same as the reference example 1 is shown in FIG. 8. The horizontal axis of the pulse height spectrum is shown as the relative value taking the pulse-height of the neutron peak of said reference example 1 as 1. Compared to the reference example 1, the pulse height that is the light amount which reached to the photodetector has lowered by about 1/75, thus the neutron peak has become broader. Along with this, a small event wherein the pulse height of the electrical signal caused by γ ray incident reaching to the same amplitude as the neutron peak can be confirmed, however it is obvious that the counting error by γ ray is very negligible.

EXAMPLE 2

Figure 9:
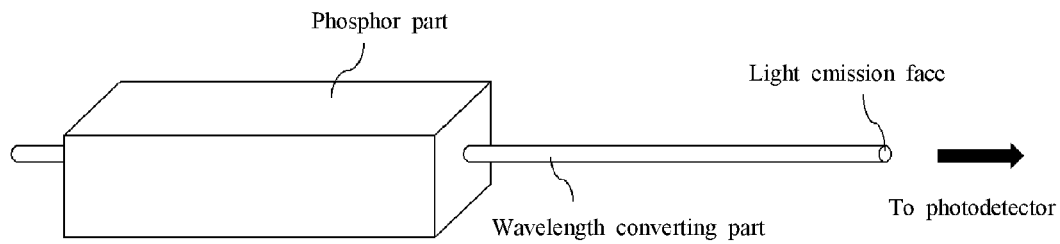
FIG. 9 is the schematic diagram of the resin based complex obtained from the example 2.

As similar to the reference example 1, the inorganic phosphor particles, the filler particles and the resin precursor were mixed, and the defoamed mixture was introduced into the mold, and one wavelength converting part comprising the wavelength converting fiber same as the example 1 was inserted into the mixture, then the resin precursor was cured by applying the heat at 60° C. for 24 hours, thereby the resin based complex wherein the wavelength converting part is contained in the phosphor part was obtained. The shape of said resin based complex is shown in FIG. 9. In said resin based complex, the ratio of the cross section area of the wavelength converting part against the cross section area of the phosphor part at the cross section perpendicular to the body axis of the wavelength converting fiber was 0.03. The outer peripheral of the phosphor part of the resin based complex was covered by the reflector made of unbaked polytetrafluoroethylene sheet, thereby the neutron scintillator of the present invention was obtained.

Figure 10:
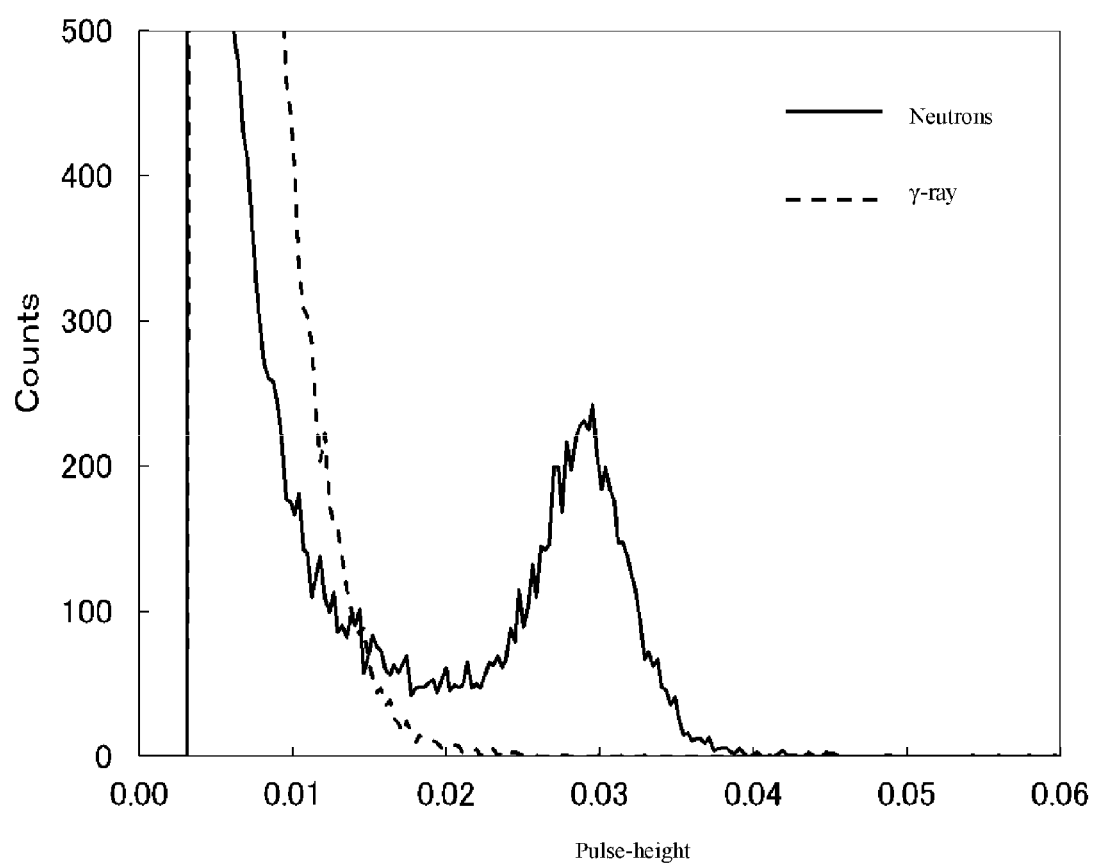
FIG. 10 is the pulse-height spectrum obtained from the example 2.

The pulse-height spectrum made as same as the reference example 1 is shown in FIG. 10. The horizontal axis of the pulse height spectrum is shown as the relative value taking the pulse-height of the neutron peak of said reference example 1 as 1. According to FIG. 10, compared to the reference example 1, the pulse height has lowered by about 1/35, however a clear neutron peak can be confirmed, and also the pulse height of the electrical signal caused by γ ray incident is significantly lower than the pulse height of the neutron peak, thus it is obvious that γ ray and neutrons can be easily discriminated.

REFERENCE EXAMPLE 2

Figure 11:
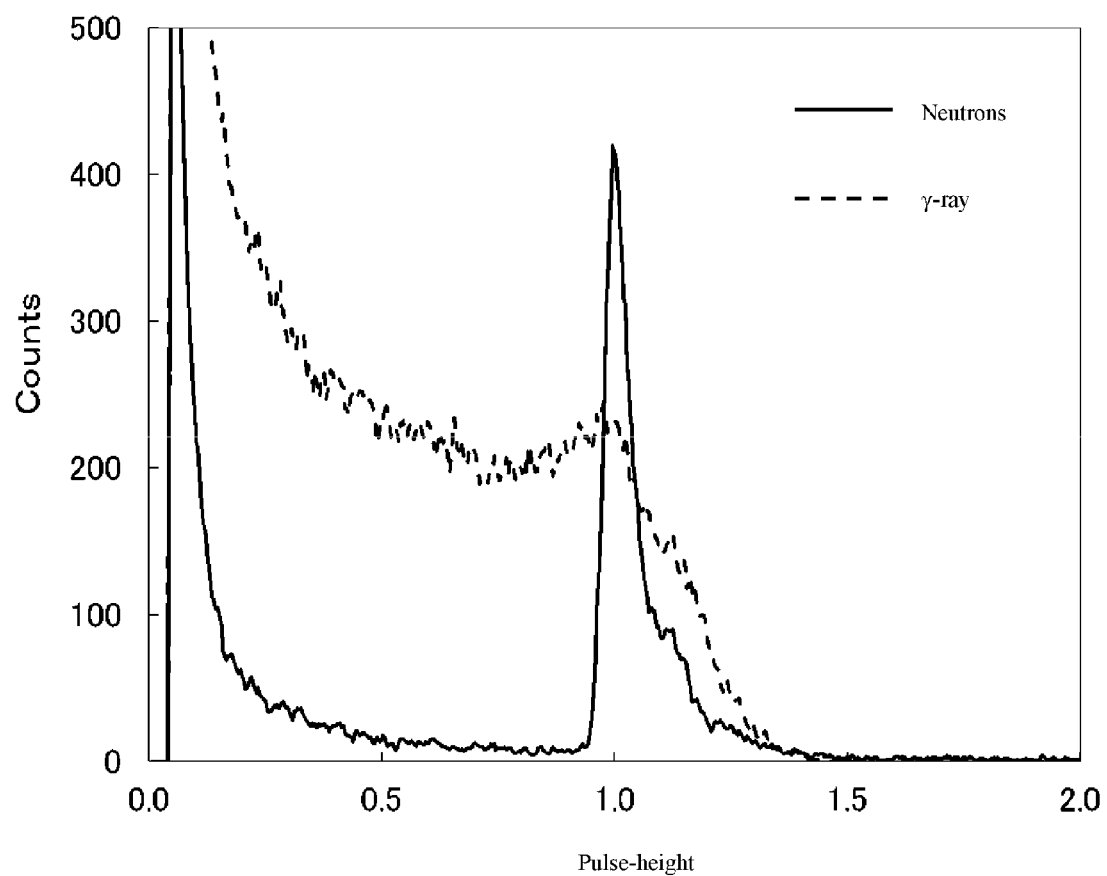
FIG. 11 is the pulse-height spectrum obtained from the reference example 2.

The neutron detector was produced as same as the reference example 1 except that $Eu:LiCaAlF_6$ single crystal having the size of 5 mm×5 mm×40 mm was used as the neutron scintillator, thereby the pulse height spectrum was made. The obtained pulse height spectrum is shown in FIG. 11. The horizontal axis is shown as the relative value taking the pulse-height of the neutron peak of the present reference example as 1. In FIG. 11, the clear neutron peak can be confirmed, however many events wherein the pulse height of the electrical signal caused by γ ray incident becomes as large as the pulse height of the neutron peak were confirmed, thus it is obvious that under the presence of high dose of γ ray, the error derived by γ ray to the neutron counting becomes significant problem.

COMPARATIVE EXAMPLE 1

Figure 12:
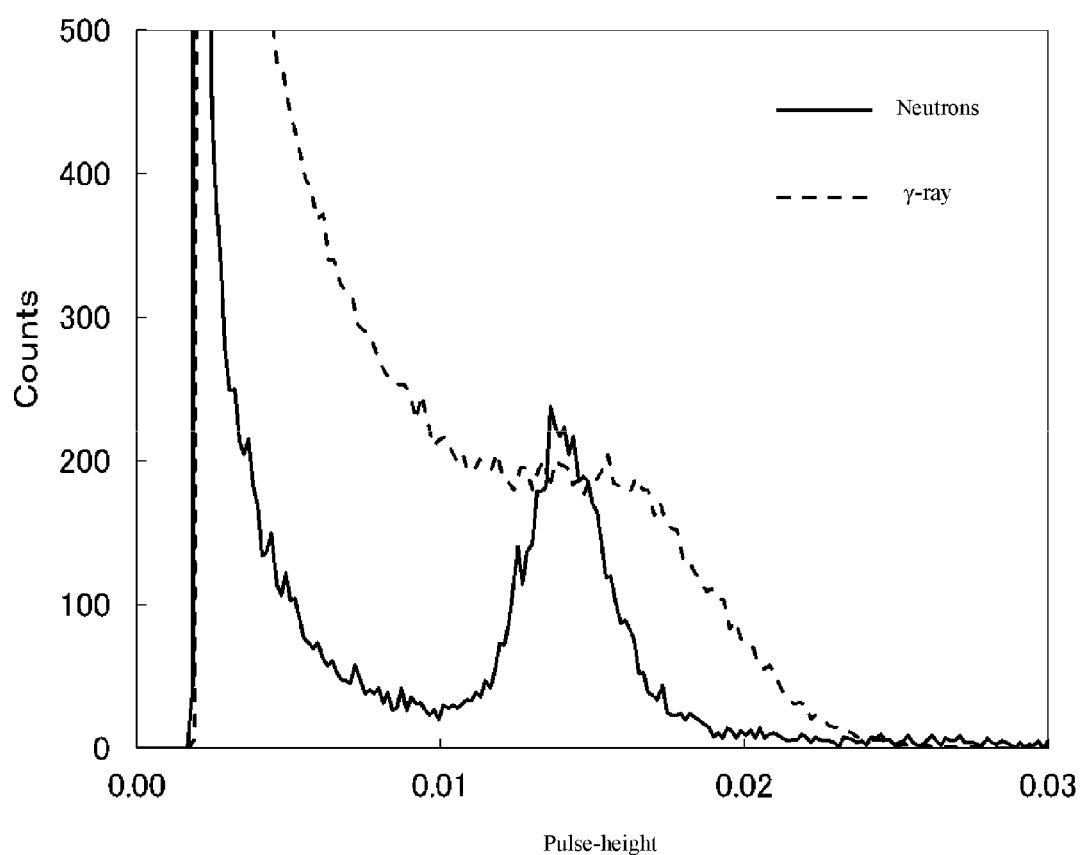
FIG. 12 is the pulse-height spectrum obtained from the comparative example 1.

The neutron scintillator was produced by placing five wavelength converting parts made of the wavelength converting fiber as similar to the example 1 except that Eu:LiCaAlF$_6$ single crystal having the size of 5 mm×5 mm×40 mm used in the reference example 2 was used as the phosphor part. The pulse height spectrum made as same as the reference example 1 is shown in FIG. 12. The horizontal axis is shown as the relative value taking the pulse-height of the neutron peak of said reference example 2 as 1. Compared to the reference example 2, the neutron peak has become broader since the pulse height that is the light amount which reached to the photodetector has lowered by about 1/71; hence the error derived from γ ray to the neutron counting becomes even more prominent problem.

The invention claimed is:

1. A neutron scintillator comprising:
a resin based complex comprising:
  a phosphor part (A) comprising a resin composition including a resin, and inorganic phosphor particles comprising at least one neutron-capturing isotope comprising lithium 6 or boron 10; and
  at least one wavelength converting part (B) comprising a wavelength converting fiber or a wavelength converting sheet.

2. The neutron scintillator as set forth in claim 1 wherein the wavelength converting part (B) is contained in the phosphor part (A).

3. The neutron scintillator as set forth in claim 1 wherein in an emission wavelength of said inorganic phosphor particles, a ratio of a refractive index of said inorganic phosphor particle against a refractive index of said resin is 0.95 to 1.05.

4. The neutron scintillator as set forth in claim 3 wherein in the emission wavelength of said inorganic phosphor particle, the ratio of the refractive index of the wavelength converting part (B) against the refractive index of said resin is 0.95 or more.

5. The neutron scintillator as set forth in claim 1 wherein in the emission wavelength of the inorganic phosphor particle, the ratio of the refractive index of the wavelength converting part (B) against said refractive index of the resin is 1 or more.

6. A neutron detector comprising the neutron scintillator as set forth in claim 1 and a photodetector.

7. A production method of a neutron scintillator comprising:
preparing inorganic phosphor particles comprising at least one neutron-capturing isotope selected from lithium 6 and boron 10,
producing a mixture by mixing said inorganic phosphor particles, and a liquid or vicus resin or resin precursor, and
placing a part of at least one wavelength converting part (B) made of a wavelength converting fiber or the wavelength converting sheet in said mixture thereby allowing a phosphor part (A) produced by placing said mixture in a container or by curing said mixture to contain a part of the wavelength converting part (B).

8. The neutron scintillator as set forth in claim 1, wherein the inorganic phosphor particles do not include a mixture comprising 1) a non-phosphor particle comprising the neutron-capturing isotope, and 2) a phosphor particle which does not comprise the neutron-capturing isotope.

9. The neutron scintillator as set forth in claim 1, wherein the at least one neutron-capturing isotope is lithium 6.

10. The neutron scintillator as set forth in claim 1, wherein the at least one neutron-capturing isotope is boron 10.

11. The neutron scintillator as set forth in claim 1, wherein the inorganic phosphor particles comprise Eu:LiCaAlF$_6$, Eu,NaLiCaAlF$_6$, Eu:LiSrAlF$_6$, or Eu,Na:LiSrAlF$_6$.

12. The neutron scintillator as set forth in claim 1, wherein the inorganic phosphor particles comprise Ce: LiCaAlF$_6$, Ce, Na: LiCaAlF$_6$, Ce: LiSrAlF$_6$, Ce: LiYF$_4$, Tb:LiYF$_4$, Eu:LiI, Ce Li$_6$Gd(BO$_3$)$_3$, Ce LiCs$_2$YCl$_6$, Ce:LiCs$_2$YBr$_6$, Ce LiCs$_2$LaCl$_6$, Ce:LiCs$_2$LaBr$_6$, Ce:LiCs$_2$CeCl$_6$, or Ce:LiRb$_2$LaBr$_6$.

13. The neutron scintillator as set forth in claim 1, wherein the resin comprises a silicone resin, a fluorine resin, poly(meth)acrylate, polycarbonate, polystyrene, polyvinyl toluene or polyvinyl alcohol.

14. The neutron scintillator as set forth in claim 1, wherein the resin comprises a silicone resin or a fluorine resin.

15. The neutron scintillator as set forth in claim 1, wherein the at least one wavelength converting part (B) comprises polystyrene, polymethylmethacrylate, or polyvinyl toluene.

* * * * *